United States Patent
Ji

(10) Patent No.: US 10,967,855 B2
(45) Date of Patent: Apr. 6, 2021

(54) VEHICLE AND METHOD FOR CONTROLLING THE SAME

(71) Applicants: Hyundai Motor Company, Seoul (KR); Kia Motors Corporation, Seoul (KR)

(72) Inventor: Sungmin Ji, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 262 days.

(21) Appl. No.: 16/183,182

(22) Filed: Nov. 7, 2018

(65) Prior Publication Data

US 2020/0047746 A1 Feb. 13, 2020

(30) Foreign Application Priority Data

Aug. 10, 2018 (KR) ........................ 10-2018-0093578

(51) Int. Cl.
*B60W 30/09* (2012.01)
*B60W 10/18* (2012.01)
*B60W 30/095* (2012.01)
*B60W 30/12* (2020.01)
*B60W 30/14* (2006.01)

(52) U.S. Cl.
CPC ............ *B60W 30/09* (2013.01); *B60W 10/18* (2013.01); *B60W 30/0953* (2013.01); *B60W 30/0956* (2013.01); *B60W 30/12* (2013.01); *B60W 30/143* (2013.01); *B60W 2420/42* (2013.01); *B60W 2520/10* (2013.01); *B60W 2540/18* (2013.01); *B60W 2554/00* (2020.02); *B60W 2710/18* (2013.01); *B60W 2710/30* (2013.01); *B60W 2720/10* (2013.01)

(58) Field of Classification Search
CPC .. B60W 10/04; B60W 50/14; B60W 2710/18; B60W 2420/42; B60W 2554/00; B60W 30/0956; B60W 30/0953; B60W 10/18; B60W 30/12; B60W 30/143; B60W 30/16; B60W 30/09
See application file for complete search history.

(56) References Cited

U.S. PATENT DOCUMENTS 6,411,901 B1 * 6/2002 Hiwatashi ................ B60Q 1/52
340/435
7,778,759 B2 * 8/2010 Tange .................... B60W 30/12
701/96

(Continued)

*Primary Examiner* — Mussa A Shaawat
(74) *Attorney, Agent, or Firm* — Mintz Levin Cohn Ferris Glovsky and Popeo, P.C.; Peter F. Corless

(57) ABSTRACT

A vehicle and a method for controlling the same are provided to advance a control start time of an (ADAS) of a vehicle. The vehicle includes an image capturing device that detects an object using an image of the object located in a peripheral region of a vehicle and a detection sensor that acquires position information of the object and speed information of the object. An input receives a command for starting the ADAS and a controller starts the ADAS when a traveling environment and traveling status of the vehicle satisfy a predefined condition. A warning start time of the ADAS is advanced by a predetermined period of time after starting operation of the ADAS and an operation release reference value for releasing the operation of the ADAS is set to be greater than a predetermined value.

24 Claims, 7 Drawing Sheets

(56) References Cited

U.S. PATENT DOCUMENTS

| | | | |
|---|---|---|---|
| 10,369,992 B2* | 8/2019 | Ji | B60W 30/18163 |
| 10,671,866 B2* | 6/2020 | Ji | B60R 1/00 |
| 2002/0087253 A1* | 7/2002 | Jeon | G06K 9/00798 |
| | | | 701/93 |
| 2006/0020389 A1* | 1/2006 | Yamamoto | G01C 21/26 |
| | | | 701/494 |
| 2009/0088925 A1* | 4/2009 | Sugawara | B60W 30/12 |
| | | | 701/41 |
| 2010/0063736 A1* | 3/2010 | Hoetzer | G08G 1/166 |
| | | | 701/301 |
| 2011/0130936 A1* | 6/2011 | Noda | G08G 1/167 |
| | | | 701/70 |
| 2013/0085976 A1* | 4/2013 | Bone | G06N 5/02 |
| | | | 706/46 |
| 2015/0120138 A1* | 4/2015 | Zeng | G01S 7/4808 |
| | | | 701/41 |
| 2015/0344040 A1* | 12/2015 | Heckmann | B60W 50/14 |
| | | | 701/1 |
| 2016/0039411 A1* | 2/2016 | Park | G01S 13/87 |
| | | | 701/70 |
| 2016/0091897 A1* | 3/2016 | Nilsson | B60W 30/16 |
| | | | 701/25 |
| 2017/0309173 A1* | 10/2017 | Heckmann | B60W 50/14 |
| 2019/0232931 A1* | 8/2019 | Heckmann | B60T 7/12 |
| 2020/0089977 A1* | 3/2020 | Lakshmi Narayanan | G06K 9/629 |

* cited by examiner

VEHICLE AND METHOD FOR CONTROLLING THE SAME

CROSS-REFERENCE TO RELATED APPLICATION

This application is based on and claims priority under 35 U.S.C. § 119 to Korean Patent Application No. 10-2018-0093578, filed on Aug. 10, 2018, the disclosure of which is incorporated by reference in its entirety.

BACKGROUND

1. Field of the Disclosure

The present disclosure relates to a vehicle and a method for controlling the same, and more particularly to a technology that advances a control start time of an advanced driver assistance system (ADAS) of a vehicle by operating the advanced driver assistance system (ADAS) based on driver awareness, as well as to increase a reference level for releasing an operation of the ADAS.

2. Description of the Related Art

A vehicle typically travels on roads or move in various directions according to rotation of at least one wheel mounted to a vehicle body. Such vehicles may include, for example, a three-wheeled or four-wheeled vehicle, a two-wheeled vehicle such as a motorcycle, a motorized bicycle, construction equipment, a bicycle, a train traveling on rails, and the like.

The number of users of vehicles as simple transportation devices is rapidly increasing and with the rapid development of vehicle technology, vehicle users are able to travel longer distances distance travel. However, within areas with high population density, road traffic situations may be deteriorated thus increasing traffic congestion.

Recently, to mitigate driver's difficulty as well as to increase driver convenience during vehicle driving, many developers are conducting intensive research into a vehicle provided with an advanced driver assistance system (ADAS), such that the ADAS-embedded vehicle may actively provide the driver with various types of information, for example, vehicle states, driver's states, peripheral environment information, etc.

A representative example of the ADAS embedded in the vehicle may include a Smart Cruise Control System (SCCS), a Lane Keeping Assist System (LKAS), a Lane Departure Warning System (LDWS), a Forward Collision Avoidance (FCA) system, an Autonomous Emergency Brake (AEB) system, etc. The ADAS may determine the degree of possibility of collision between a host vehicle provided with the ADAS and another peripheral vehicle (or an oncoming vehicle) while the host vehicle is being driven. When there is a high possibility of collision between the host vehicle and other vehicles, the ADAS may allow the host vehicle to perform emergency braking to avoid collision between the host vehicle and other vehicles. Thus, the host vehicle provided with the ADAS may travel on roads while being spaced apart from a preceding vehicle by a constant distance and may also be prevented from inadvertently departing from a current lane.

Further, the ADAS may have difficulty in rapidly coping with either sudden vehicle manipulation of the driver operating the ADAS-embedded vehicle or sudden change in vehicle traveling environments. In addition, it is necessary for the ADAS to recognize driver intention in a manner that starting or stopping of the ADAS may be executed according to the recognized driver intention. For this reason, there is a need for new technology for automatically operating the ADAS by recognizing driver intention, guaranteeing the safety of vehicle traveling, and preparing for unexpected careless driving situations by releasing the ADAS only in a specific situation.

SUMMARY

Therefore, it is an aspect of the present disclosure to provide a technology for advancing a control start time of an advanced driver assistance system (ADAS) of a vehicle by operating the advanced driver assistance system (ADAS) when there is a high possibility of careless driving by a driver (e.g., driver awareness) operating the vehicle, and increasing a reference level for releasing an operation of the ADAS to reduce the possibility of danger caused by such careless driving situation of the driver. Additional aspects of the invention will be set forth in part in the description which follows and, in part, will be obvious from the description, or may be learned by practice of the invention.

In accordance with an aspect of the present disclosure, a vehicle may include an image capturing device configured to detect an object by capturing an image of the object located in a peripheral region of a vehicle, a detection sensor configured to acquire at least one position information of the object and speed information of the object, an input configured to receive a command for starting an operation of an ADAS of the vehicle, and a controller configured to receive the command for starting the operation of the ADAS of the vehicle, start operation of the ADAS when a traveling environment and traveling status of the vehicle satisfy a predefined condition, advance a warning start time based on the operation of the ADAS by a predetermined time after starting operation of the ADAS, and allow an operation release reference value for releasing the operation of the ADAS to be higher than a predetermined value.

The controller may be configured to determine the traveling environment of the vehicle based on at least one of information detected by the image capturing device and information acquired by the detection sensor. The traveling environment of the vehicle may include at least one of a width of a road on which the vehicle 1 travels, a curvature (C1) of the road on which the vehicle travels, a distance to an obstacle located in a forward direction of the traveling vehicle, and a time-to-collision (TTC) time between the vehicle and the object. The controller may also be configured to determine the traveling status of the vehicle based on at least one of a traveling speed of the vehicle and a steering angle of the vehicle.

When the width of the road on which the vehicle travels is less than a predetermined length, when a curvature of the traveling road of the vehicle is less than a predetermined curvature value, when the distance between the vehicle and the obstacle is less than a predetermined distance, and when a time-to-collision (TTC) time between the vehicle and the object is longer than a predetermined time, the controller may be configured to determine that the traveling environment of the vehicle has satisfied the predefined condition. When the traveling speed of the vehicle is less than a predetermined speed and when the steering angle of the vehicle is less than a predetermined angle, the controller may be configured to determine that the traveling status of the vehicle has satisfied the predefined condition.

Further, the controller may be configured to calculate a time-to-collision (TTC) time between the vehicle and the object according to at least one of the position information and the speed information of the object detected by the detection sensor. When the advanced driver assistance system (ADAS) starts operation, the controller may be configured to advance a collision warning start time determined based on the calculated time-to-collision (TTC) time by a predetermined time.

When the ADA) starts operation, the controller may allow the operation release reference time for releasing the advanced driver assistance system (ADAS) operation to be higher than the predetermined value by a predetermined magnitude. When a numerical value of a variable based on a change of the traveling status of the vehicle is greater than the increased operation release reference time, the controller may be configured to stop operation of the advanced driver assistance system (ADAS). The numerical value of the variable based on the change of the traveling status of the vehicle may include at least one of a numerical value indicating a traveling speed of the vehicle and a numerical value indicating a steering angle of the vehicle.

When the numerical value indicating the traveling speed of the vehicle is greater than the increased operation release reference value, the controller may be configured to stop operation of the advanced driver assistance system (ADAS). When the numerical value indicating the steering angle of the vehicle is greater than the increased operation release reference value, the controller may be configured to stop operation of the advanced driver assistance system (ADAS). After lapse of a predetermined period of time from beginning of the operation of the advanced driver assistance system (ADAS), the controller may be configured to stop the operation of the advanced driver assistance system (ADAS). When the advanced driver assistance system (ADAS) starts operation and a command for stopping operation of the advanced driver assistance system (ADAS) is then input to the controller, the controller may be configured to stop operation of the advanced driver assistance system (ADAS).

The vehicle may further include a speed sensor configured to detect a traveling speed of the vehicle, and a speed regulator configured to regulate the traveling speed of the vehicle. The advanced driver assistance system (ADAS) may include at least one of a Smart Cruise Control System (SCCS), a Lane Keeping Assist System (LKAS), a Lane Departure Warning System (LDWS), a Forward Collision Avoidance (FCA) system, and an Autonomous Emergency Brake (AEB) system.

In accordance with another aspect of the present disclosure, a method for controlling a vehicle may include detecting an object by capturing an image of the object located in a peripheral region of a vehicle, acquiring at least one position information of the object and speed information of the object, receiving a command for starting an operation of an advanced driver assistance system (ADAS) of the vehicle, starting the operation of the advanced driver assistance system (ADAS) when a traveling environment and traveling status of the vehicle satisfy a predefined condition, advancing a warning start time based on the operation of the advanced driver assistance system (ADAS) by a predetermined time when the advanced driver assistance system (ADAS) starts operation, and allowing an operation release reference value for releasing the operation of the advanced driver assistance system (ADAS) to be higher than a predetermined value.

The method may further include determining the traveling environment of the vehicle based on at least one of information detected through the object image capturing and the acquired information. The traveling environment of the vehicle may include at least one of a width of a road on which the vehicle 1 travels, a curvature (C1) of the road on which the vehicle travels, a distance to an obstacle located in a forward direction of the traveling vehicle, and a time-to-collision (TTC) time between the vehicle and the object. The method may further include determining the traveling status of the vehicle based on at least one of a traveling speed of the vehicle and a steering angle of the vehicle.

Additionally, the method may include, when the width of the road on which the vehicle travels is less than a predetermined length, when a curvature of the traveling road of the vehicle is less than a predetermined curvature value, when the distance between the vehicle and the obstacle is less than a predetermined distance, and when a time-to-collision (TTC) time between the vehicle and the object is longer than a predetermined time, determining that the traveling environment of the vehicle has satisfied the predefined condition. When the traveling speed of the vehicle is less than a predetermined speed and when the steering angle of the vehicle is less than a predetermined angle, the method may include determining that the traveling status of the vehicle has satisfied the predefined condition.

The method may further include calculating a time-to-collision (TTC) time between the vehicle and the object according to at least one of the position information and the speed information of the object. The advancing of the warning start time by the predetermined time may include, after the advanced driver assistance system (ADAS) starts operation, advancing a collision warning start time determined based on the calculated time-to-collision (TTC) time by the predetermined time.

Further, the method may include, when the advanced driver assistance system (ADAS) starts operation, allowing the operation release reference time for releasing the advanced driver assistance system (ADAS) operation to be higher than the predetermined value by a predetermined magnitude, and when a numerical value of a variable based on a change of the traveling status of the vehicle is greater than the increased operation release reference time, stopping operation of the advanced driver assistance system (ADAS).

The numerical value of the variable based on the change of the traveling status of the vehicle may include at least one of a numerical value indicating a traveling speed of the vehicle and a numerical value indicating a steering angle of the vehicle. The method may further include, when the numerical value indicating the traveling speed of the vehicle is greater than the increased operation release reference value, stopping operation of the advanced driver assistance system (ADAS), and when the numerical value indicating the steering angle of the vehicle is greater than the increased operation release reference value, stopping operation of the advanced driver assistance system (ADAS).

After lapse of a predetermined period of time from beginning of the operation of the advanced driver assistance system (ADAS), the method may include stopping operation of the advanced driver assistance system (ADAS). The method may further include, upon receiving a command for stopping operation of the advanced driver assistance system (ADAS) after beginning of the operation of the advanced driver assistance system (ADAS), stopping operation of the advanced driver assistance system (ADAS).

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
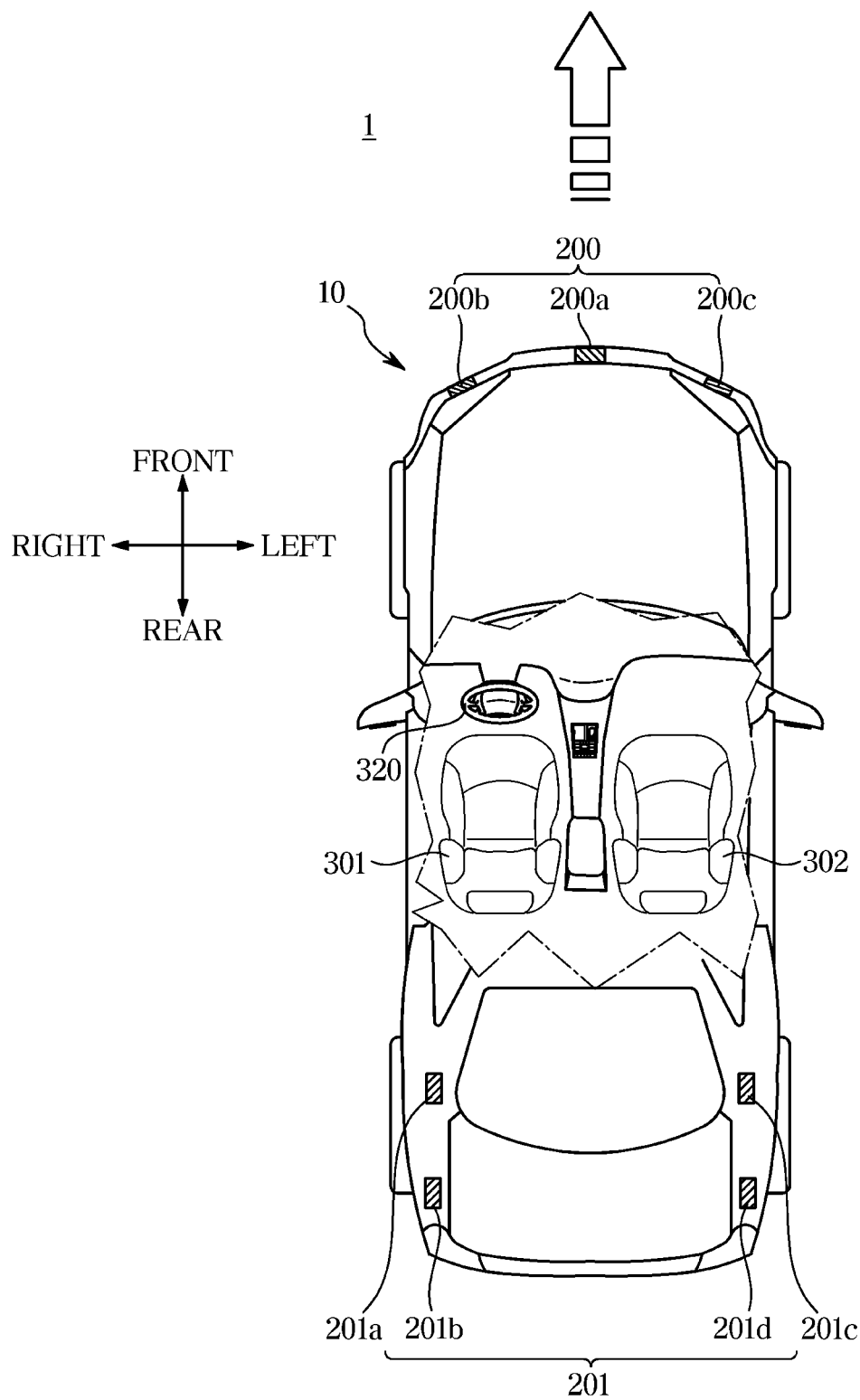
FIG. 1 is a view illustrating detection sensors and rear-lateral detection sensors mounted to a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout. It should be noted that the specification of the present disclosure does not describe all the constituent elements of the exemplary embodiments, and general matters well known to those skilled in the art and redundant matters of the exemplary embodiments will not be described herein for clarity.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network. In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the exemplary embodiments of the present disclosure will hereinafter be given with reference to the attached drawings. A vehicle and a method for controlling the same according to exemplary embodiments of the present disclosure will hereinafter be given with reference to the attached drawings.

FIG. 1 is a view illustrating detection sensors and rear-lateral detection sensors mounted to a vehicle according to an exemplary embodiment of the present disclosure. For convenience of description and better understanding of the present disclosure, a first direction in which the vehicle 1 moves forward will hereinafter be referred to as a forward direction, and two horizontal directions with respect to the forward direction of the vehicle 1 will hereinafter be referred to as a left direction and a right direction, respectively. If the forward direction of the vehicle 1 is in the 12 o'clock direction, the 3 o'clock direction or the surrounding area thereof with respect to the 12 o'clock direction will hereinafter be defined as the right direction (RIGHT), and the 9 o'clock direction or the surrounding area thereof with respect to the 12 o'clock direction will hereinafter be defined as the left direction (LEFT).

An opposite direction to the forward direction will hereinafter be defined as a backward direction. A direction toward the bottom of the vehicle 1 will hereinafter be referred to as a downward direction, and an opposite direction to the downward direction (DOWN) will hereinafter be defined as an upward direction (UP). In addition, one surface disposed at the front of the vehicle 1 will hereinafter be defined as a front surface, one surface disposed at the rear of the vehicle 1 will hereinafter be defined as a rear surface, and one surface disposed at the side of the vehicle 1 will hereinafter be defined as a side surface. From among the side surfaces, a left-directional side surface will hereinafter be defined as a left lateral surface, and a right-directional side surface will hereinafter be defined as a right lateral surface.

Although not shown in the drawings, at least one image capturing device 350 (e.g., camera, video camera, or the like) may be provided in the vehicle 1. The image capturing device 350 may be configured to capture peripheral images of the vehicle 1 during operation or stopping of the vehicle 1, may be configured to detect the presence or absence of a peripheral object located close to the vehicle 1 (e.g., in the vicinity of the vehicle), and may be configured to acquire category and position information of the detected peripheral object. The peripheral object capable of being captured by the image capturing device 350 in a peripheral region or vicinity of the vehicle 1 may include a peripheral vehicle, a pedestrian, a bicycle, etc. In addition, the peripheral object may further include moving objects or various stationary obstacles.

The image capturing device 350 may be configured to capture images of a target object located in a peripheral region of the vehicle 1, recognize type or category information of the target object by distinguishing an external shape of the captured target object through image recognition, and may be configured to transmit the recognized information to the controller 100. There is no limitation as to installation position of the image capturing device 350, and the image capturing device 350 may also be disposed at any position where image information may be acquired by the image capturing part 350 designed to capture inside or outside images of the vehicle 1. The image capturing device 350 may include at least one camera. In order to more clearly capture images, the image capturing device 350 may include a three-dimensional (3D) space recognition sensor (e.g., a 3D laser range finder (LRF) sensor), a radar sensor, an ultrasonic sensor, etc.

Referring to FIG. 1, the vehicle 1 may include a detection sensor module 200. The detection sensor 200 may be configured to detect the presence or absence of a target object located in a forward direction of the vehicle 1, and acquire at least one of position information and traveling speed information of the detected target object. The detection sensor 200 according to one exemplary embodiment of the present disclosure may be configured to acquire at least one of position information and speed information of the target object located in the vicinity of the vehicle 1 based on the current position of the vehicle 1. In other words, the detection sensor 200 may be configured to acquire, in real time, coordinate information changed with movement of the target object, and may be configured to detect a distance between the vehicle 1 and the target object.

As will be described later, the controller 100 (see FIG. 2) may be configured to calculate a relative distance between the vehicle 1 and the target object and a relative speed between the vehicle 1 and the target object, upon receiving the target object position information and the target object speed information from the detection sensor module 200. Then, the controller may be configured to calculate a Time-To-Collision (TTC) time between the vehicle 1 and the target object using the calculated relative distance and the calculated relative speed.

As shown in FIG. 1, the detection sensor 200 may include a first detection sensor 200*a*, a second detection sensor 200*b*, and a third detection sensor 200*c* installed on the vehicle 1 to detect the presence or absence of other vehicles. For example, the first detection sensor 200*a*, the second detection sensor 200*b*, or the third detection sensor 200*c* may be configured to detect the presence or absence of an object (i.e., a peripheral vehicle) located in the forward direction of the vehicle 1, an object (i.e., a peripheral vehicle) located in the lateral direction of the vehicle 1, or an object (i.e., a peripheral vehicle) located in a front lateral direction of the vehicle 1. In accordance with one exemplary embodiment, the detection sensors 200 (200*a*, 200*b*, 200*c*) may be installed at the front, left, and right sides of the vehicle 1, such that the detection sensors 200 (200*a*, 200*b*, 200*c*) may be configured to detect the presence or absence of an object located in the forward direction of the vehicle 1, the presence or absence of an object located in a direction (hereinafter referred to as a front left direction) interposed between the left direction and the forward direction of the vehicle 1, and the presence or absence of an object located in a direction (hereinafter referred to as a front right direction) interposed between the right direction and the forward direction of the vehicle 1.

The first detection sensor 200*a* may be disposed at a radiator grille 6 of the vehicle 1. For example, the first detection sensor 200*a* may be installed in the radiator grille 6, and there is no limitation as to installation position of the first detection sensor 200*a* capable of detecting the presence or absence of a peripheral vehicle located in the forward direction of the vehicle 1. For convenience of description and better understanding of the present disclosure, the exemplary embodiment of the present disclosure has exemplarily disclosed that the first detection sensor 200*a* is disposed at the front center of the vehicle 1. In addition, the second detection sensor 200*b* may be disposed at the left side of the vehicle 1, and the third detection sensor 200*c* may be disposed at the right side of the vehicle 1.

The detection sensor 200 may include a rear lateral detection sensor 201. The rear lateral detection sensor 201 may be configured to detect the presence or absence of a pedestrian (or a peripheral vehicle) located or moving either in the backward direction of the vehicle 1, in the lateral direction of the vehicle 1, or in a direction (hereinafter referred to as a rear lateral direction) interposed between the backward direction and the lateral direction of the vehicle 1. As shown in FIG. 1, the rear lateral detection sensor 201 may include a first rear-lateral detection sensor 201*a*, a second rear-lateral detection sensor 201*b*, a third rear-lateral detection sensor 201*c*, and a fourth rear-lateral detection sensor 201*d*. The first rear-lateral detection sensor 201*a*, the second rear-lateral detection sensor 201b, the third rear-lateral detection sensor 201c, and the fourth rear-lateral detection sensor 201d may be installed on the vehicle 1 to detect the presence or absence of other vehicles (e.g., a peripheral vehicle located in the lateral direction of the vehicle 1, a peripheral vehicle located in the backward direction of the vehicle 1, and/or a peripheral vehicle located in the rear lateral direction of the vehicle 1).

In accordance with one exemplary embodiment, the rear-lateral detection sensors of the rear lateral detection sensor 201 may be installed at both the left side and the right side of the vehicle 1, such that the rear-lateral detection sensors may be configured to detect the presence or absence of an object located in a direction (hereinafter referred to as a rear-left-lateral direction) interposed between the left lateral direction and the backward direction of the vehicle 1, and may also be configured to detect the presence or absence of an object located in a direction (hereinafter referred to as a rear-right-lateral direction) interposed between the right lateral direction and the backward direction of the vehicle 1. For example, the first rear-lateral detection sensor 201a or the second rear-lateral detection sensor 201b may be disposed at the left side of the vehicle 1, and the third rear-lateral detection sensor 201c or the fourth rear-lateral detection sensor 201d may be disposed at the right side of the vehicle 1.

For example, the detection sensors of the detection sensor 200 may be implemented using various types of sensors, for example, a radar sensor configured to use millimeter waves (mmW) or microwaves, a Light Detection And Ranging (LiDAR) sensor configured to use pulse laser light, a vision sensor configured to use visible light, an infrared sensor configured to use infrared light, and an ultrasonic sensor configured to use ultrasonic waves. The detection sensors of the detection sensor 200 may be implemented using any one of the above-mentioned sensors or a combination thereof. If one vehicle 1 is provided with the plurality of detection sensors 200, the respective detection sensors 200 may be implemented using the same or different devices, or may also be implemented using various devices and combinations capable of being considered by a system designer.

A display 303 for use within the vehicle 1 (hereinafter referred to as a display) may be installed at an upper panel of a dashboard (not shown). The display 303 may be configured to display or output images thereon to provide the driver or passenger with various types of information using the displayed images. For example, the display 303 may audio-visually provide the driver or passengers with maps, weather, news, music, various moving images or still images, and various types of information (e.g., air-conditioner information, etc.) associated with states or operations of the vehicle 1. In addition, the display 303 may provide the driver or passengers with various warning messages based on different danger levels.

In particular, when the vehicle 1 changes a current lane to another lane during vehicle driving or when there is a high possibility of collision between the vehicle 1 and other vehicles, the display 303 may be configured to output different warning messages based on different danger levels to the driver or passengers. In addition, even when the vehicle 1 has to deviate from a current lane or has to travel on roads while maintaining a constant distance to a preceding vehicle, the display 303 may be configured to output a warning message to the driver.

In addition, as will be described later, when the ADAS of the vehicle 1 starts or stops operation, the display 303 may be configured to provide the driver with operation state information of the system. The display 303 may also be implemented as a general navigation device as necessary. The center fascia (not shown) may be installed at the center of the dashboard, and may include one or more input parts 318 (318a to 318c) for allowing a user to input various commands associated with the vehicle 1. The input parts 318a to 318c may be implemented using a physical button, a switch, a knob, a touchpad, a touchscreen, a stick-type manipulation device, a trackball, or the like. The driver may control various operations of the vehicle 1 using the input parts 318a to 318c.

As will be described later, the driver of the vehicle 1 may input a command for starting the ADAS of the vehicle 1 through any input part. In other words, when the driver anticipates a high possibility of driver's careless driving situation during traveling of the vehicle 1 and inputs a command for starting the ADAS using the input part to prevent occurrence of such careless driving situation, the controller 100 may be configured to determine whether the traveling environment or the traveling status of the vehicle 1 corresponds to or satisfies a predetermined condition, to thus start operation of the ADAS when the predetermined condition is satisfied.

The dashboard may be connected to a steering wheel and an instrument panel that are arranged to face the driver seat. The steering wheel may be rotatable in a predetermined direction according to the driver's manipulation, and front wheels or rear wheels of the vehicle 1 may rotate in the rotation direction of the steering wheel to steer the vehicle 1 in a driver-desired direction. The steering wheel may include a spoke connected to a rotation shaft, and a knob wheel connected to the spoke. The spoke may also include at least one input part for receiving various commands from a user such as the driver. The input part may be implemented using a physical button, a knob, a touchpad, a touchscreen, a stick-type manipulation device, a track ball, or the like.

Figure 2:
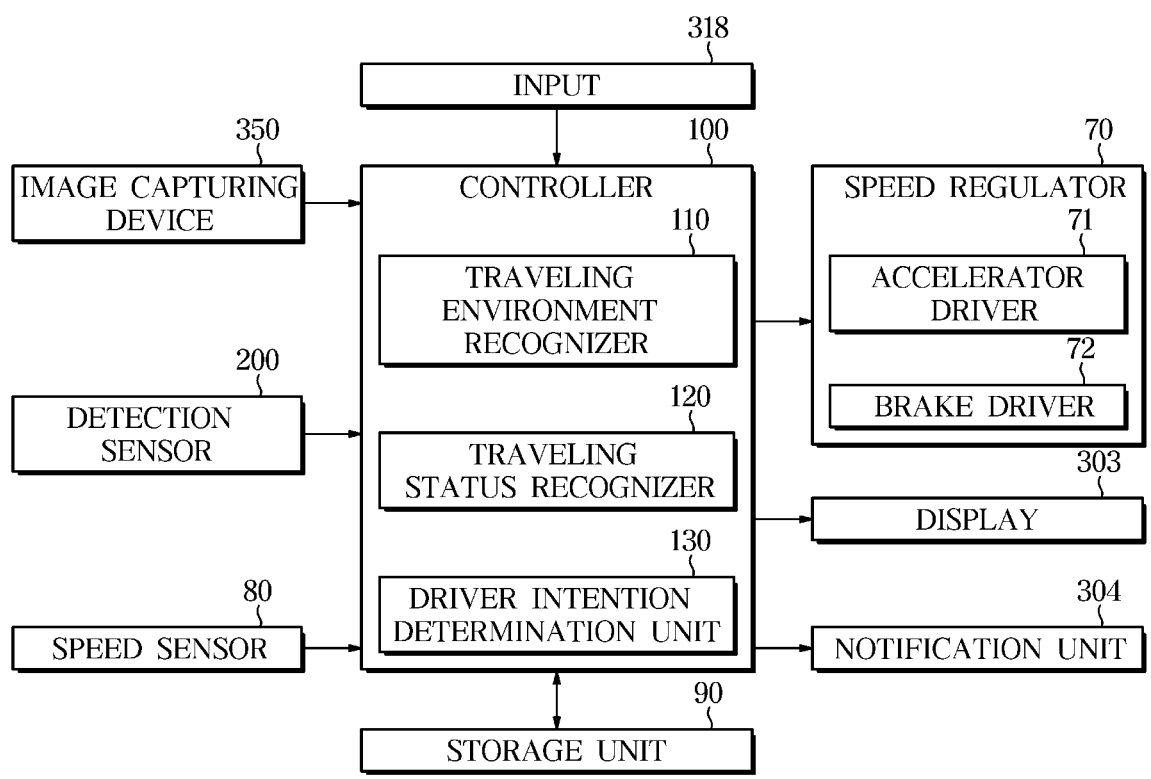
FIG. 2 is a block diagram illustrating a vehicle according to an exemplary embodiment of the present disclosure.
Figure 3A:
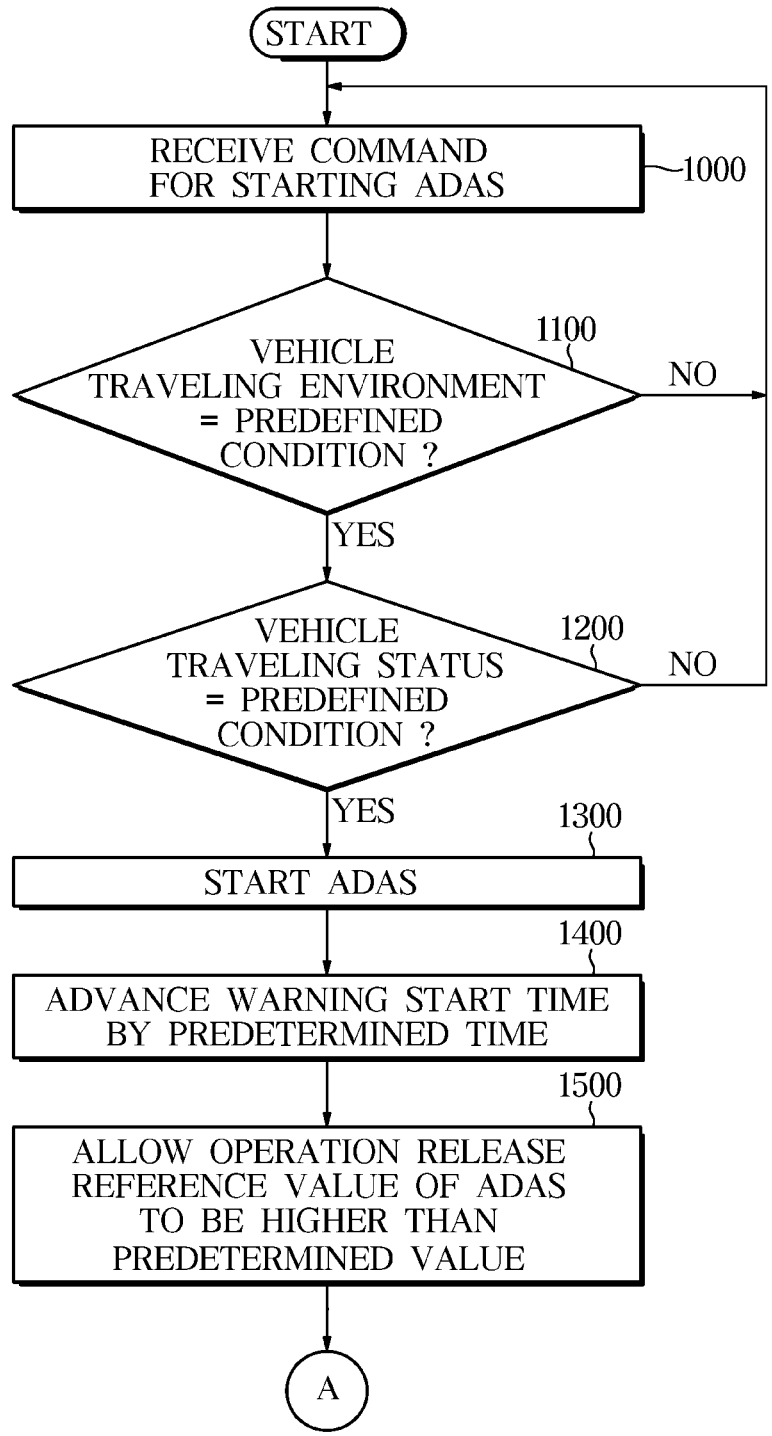
FIG. 3A and FIG. 3B are flowcharts illustrating a method for controlling the vehicle according to an exemplary embodiment of the present disclosure.
Figure 3B:
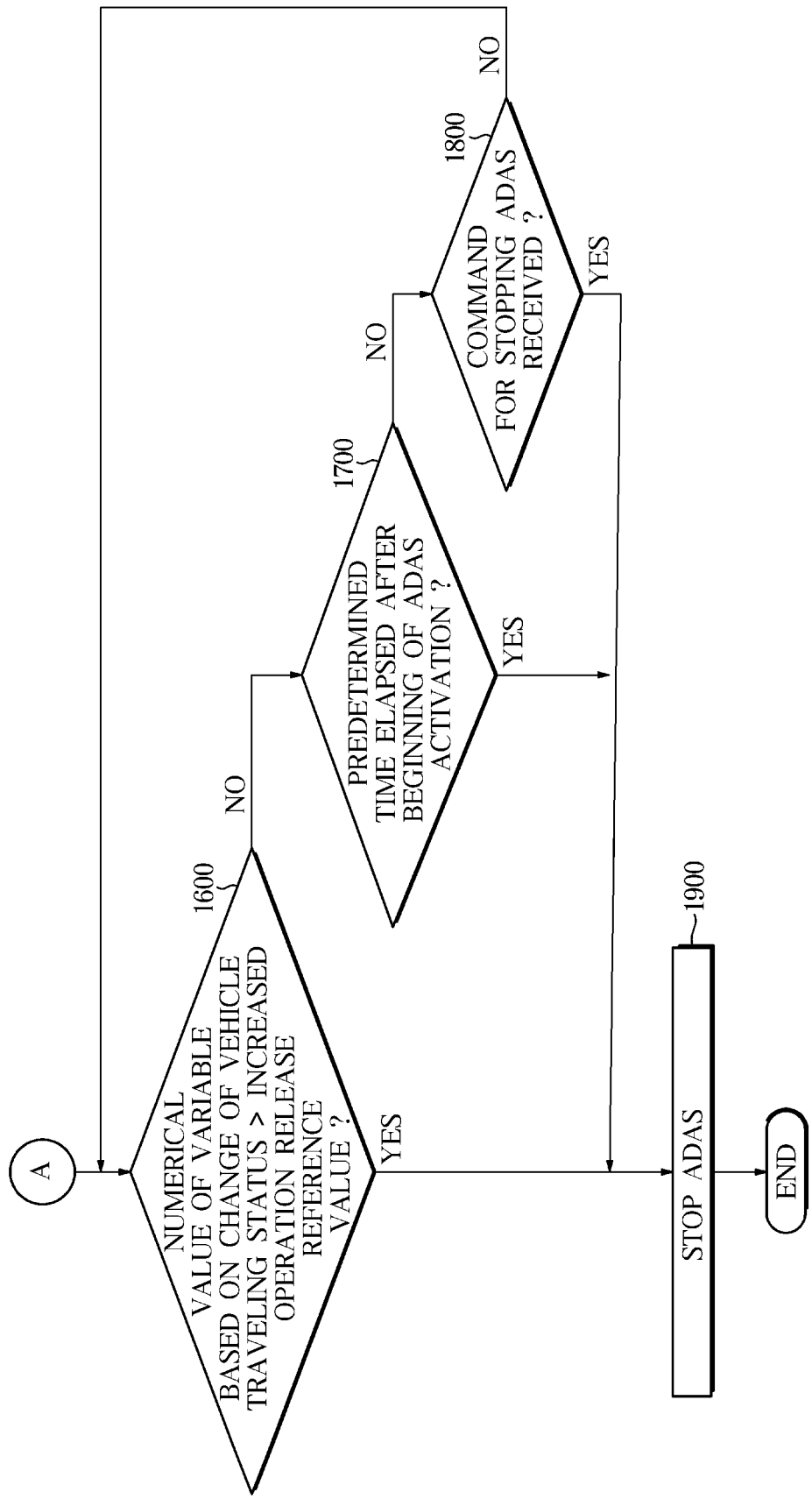
Figure 4:
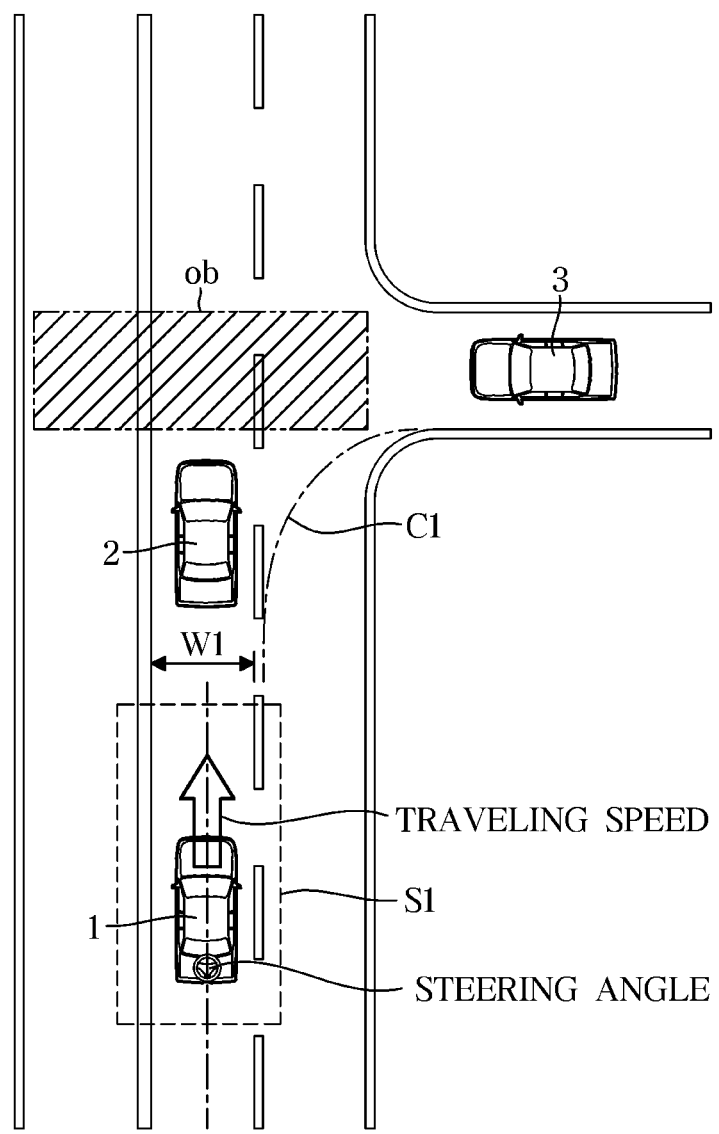
FIG. 4 is a conceptual diagram illustrating a method for determining whether a vehicle traveling environment and a vehicle traveling status satisfy an operation start condition of an advanced driver assistance system (ADAS) according to an exemplary embodiment of the present disclosure.
Figure 5:
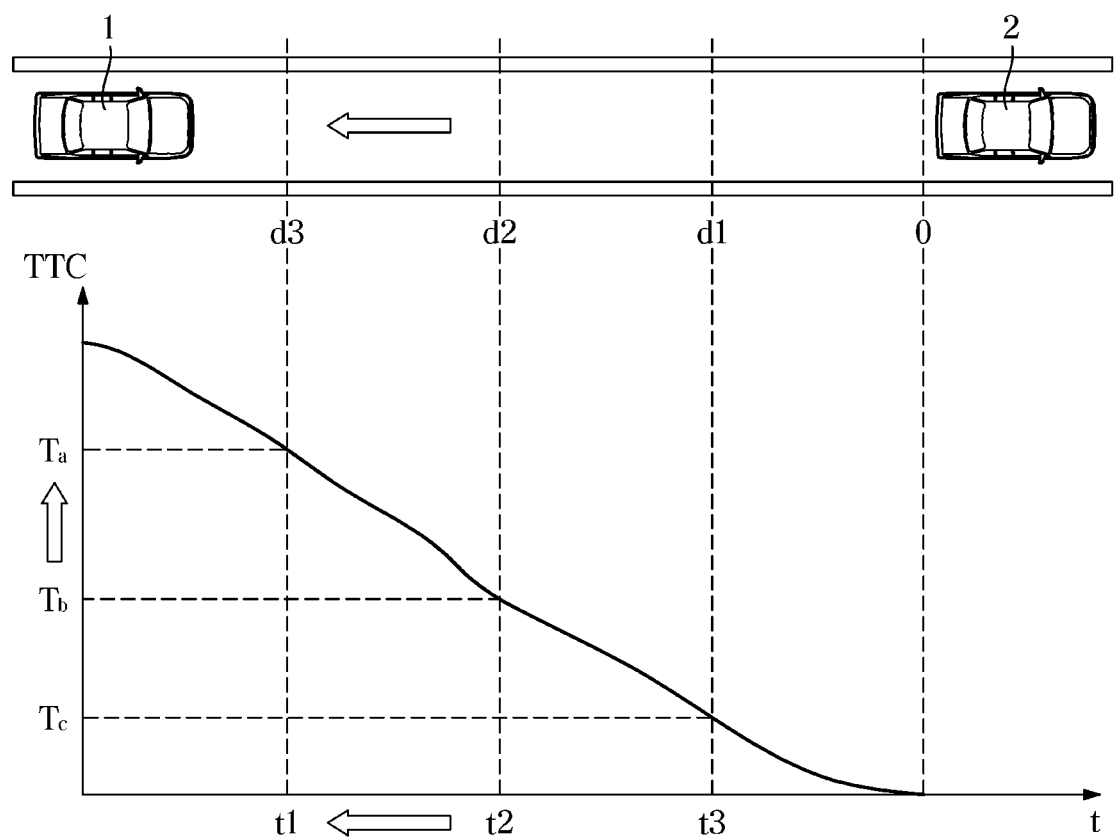
FIG. 5 is a conceptual diagram illustrating a method for advancing a warning start time according to beginning of the ADAS operation according to an exemplary embodiment of the present disclosure.
Figure 6:
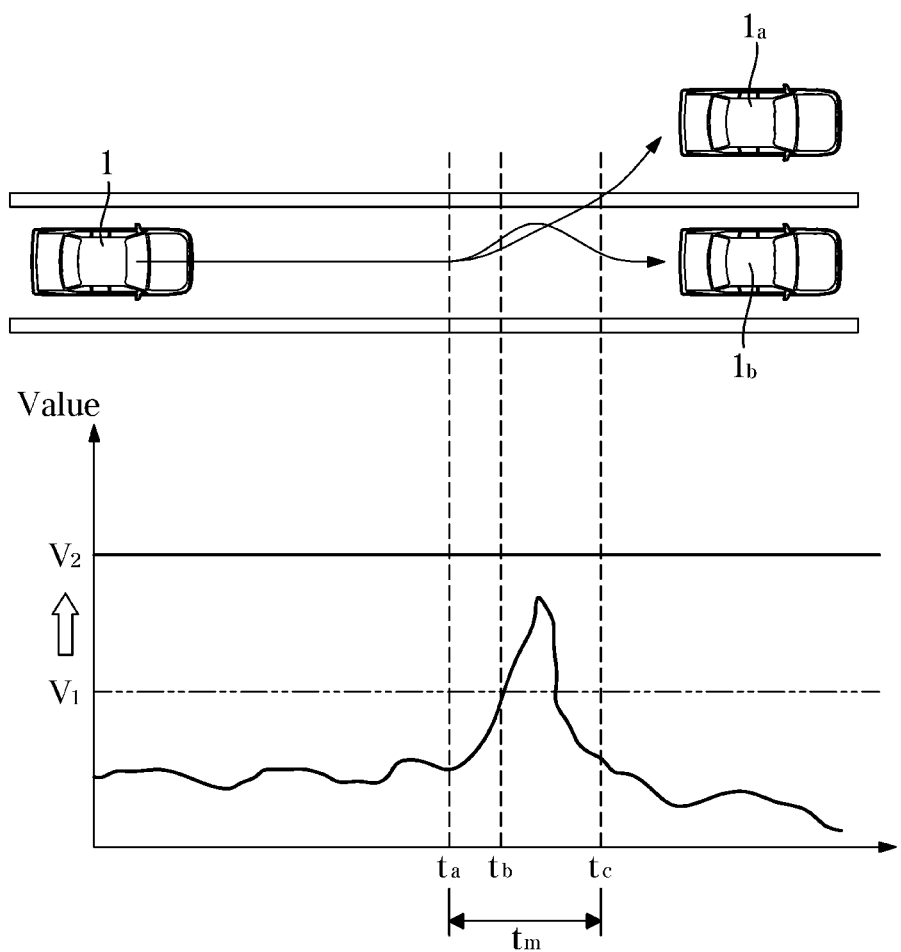
FIG. 6 is a conceptual diagram illustrating a method for raising a reference value needed to release the ADAS operation according to beginning of the ADAS operation according to an exemplary embodiment of the present disclosure.

FIG. 2 is a block diagram illustrating the vehicle according to an exemplary embodiment of the present disclosure. FIG. 3A and FIG. 3B are flowcharts illustrating a method for controlling the vehicle according to an exemplary embodiment of the present disclosure. FIG. 4 is a conceptual diagram illustrating a method for determining whether a vehicle traveling environment and a vehicle traveling status satisfy an operation start condition of an advanced driver assistance system (ADAS) according to an exemplary embodiment of the present disclosure. FIG. 5 is a conceptual diagram illustrating a method for advancing a warning start time according to beginning of the ADAS operation according to an exemplary embodiment of the present disclosure. FIG. 6 is a conceptual diagram illustrating a method for raising a reference value needed to release the ADAS operation according to beginning of the ADAS operation according to an exemplary embodiment of the present disclosure.

Referring to FIG. 2, the vehicle 1 may include a speed regulator 70, a speed sensor 80, a storage unit 90, a controller 100, and a notification unit 302. The speed regulator 70 may be configured to adjust or regulate a traveling speed of the vehicle 1 steered by the driver. The speed sensor 80 may be configured to sense or detect a traveling speed of the vehicle 1. The storage unit 90 may be configured to store data associated with control of the vehicle 1. The controller 100 may be configured to adjust a traveling speed of the vehicle 1 as well as to operate respective constituent elements of the vehicle 1. The notification unit 304 may provide the driver with various types of information associated with the operation and traveling of the vehicle 1.

The speed regulator 70 may be configured to adjust or regulate the speed of the vehicle 1 steered by the driver. The speed regulator 70 may include an accelerator driver 71 and a brake driver 72. The accelerator driver 71 may be configured to operate an accelerator (e.g., acceleration pedal) upon receiving a control signal from the controller 100, thereby accelerating the vehicle 1. The brake driver 72 may be configured to operate a brake (e.g., brake pedal) upon receiving a control signal from the controller 100, thereby decelerating the vehicle 1. In other words, the controller 100 may be configured to operate the brake driver 72 based on a time-to-collision (TTC) time of the vehicle 1, thereby adjusting the braking of the vehicle 1.

The controller 100 may be configured to accelerate or decelerate the vehicle 1 to either decrease or increase a distance between the vehicle 1 and another object based on the distance between the vehicle 1 and another object and also based on a predefined reference distance stored in the storage unit 90. In addition, the controller 100 may be configured to calculate a TTC time between the vehicle 1 and a target object based on a relative distance between the vehicle 1 and the target object and also based on a relative speed between the vehicle 1 and the target object, and may be configured to transmit a signal for adjusting the traveling speed of the vehicle 1 based on the calculated TTC time to the speed regulator 70.

The speed regulator 70 may be configured to adjust or regulate the traveling speed of the vehicle 1 under control of the controller 100. When there is a high possibility of collision between the vehicle 1 and another object, the speed regulator 70 may be configured to reduce the traveling speed of the vehicle 1 by decelerating the vehicle 1. The speed sensor 80 may be configured to detect the traveling speed of the vehicle 1 steered by the driver upon receiving a control signal from the controller 100. In other words, the speed sensor 80 may be configured to detect the traveling speed of the vehicle 1 using a rotation speed of wheels of the vehicle 1. The traveling speed of the vehicle 1 may be denoted by [kph] (where kph: kilometer per hour), expressing the number of kilometers travelled in one hour [h].

The storage unit 90 may be configured to store various types of data related to control of the vehicle 1. In particular, the storage unit 90 may be configured to store a traveling speed, a traveling distance, and a traveling time of the vehicle 1. The storage unit 90 may also be configured to store position information and speed information of a target object that is captured by the image capturing part 350 or detected by the detection sensor module 200, and store real-time coordinate information of a target object moving from place to place, a relative distance between the vehicle 1 and the target object, and a relative speed between the vehicle 1 and the target object. The storage unit 90 may be configured to store data of the TTC time that is calculated in real time by the controller 100 during traveling of the vehicle 1.

Further, the storage unit 90 may be configured to store predefined conditions associated with the traveling environment and traveling status of the vehicle 1. Particularly, the predefined conditions are needed to start operation of the ADAS of the vehicle 1. The storage unit 90 may also be configured to store data associated with a predetermined time needed for starting or releasing the ADAS. The storage unit 90 may be configured to store data regarding numerical equations and control algorithm needed to operate the vehicle 1 therein, and the controller 100 may be configured to output a control signal for operating the vehicle 1 according to the numerical equations and the control algorithm.

Although the storage unit 90 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. The storage unit 90 may be a memory that is implemented as a separate chip independent of the above processor related to the controller 100, or may be implemented as a processor and a single chip.

Referring back to FIG. 2, at least one controller 100 may be provided within the vehicle 1. The controller 100 may be configured to electronically operate constituent elements related to the operation of the vehicle 1. A vehicle and a method for controlling the same according to the exemplary embodiment of the present disclosure will hereinafter be described with reference to FIG. 3A and FIG. 3B.

The ADAS of the vehicle 1 may have difficulty in rapidly responding to either sudden vehicle manipulation of the driver or sudden change in vehicle traveling environments during traveling of the vehicle 1. In other words, if another vehicle suddenly cuts in front of the driver's vehicle 1 (i.e., a host or subject vehicle) while the driver is distracted and not maintaining a forward direction of eyesight, the ADAS of the host vehicle 1 may not rapidly respond to a high possibility of collision with another vehicle. Moreover, if an unexpected dangerous situation (e.g., driver's coughs or sneezes) occurs in the traveling time of the host vehicle 1, the driver may have difficulty in safely steering the host vehicle 1 due to such dangerous situation, and thus, the host vehicle 1 steered by the driver may suddenly deviate from a current lane.

Therefore, according to the vehicle and the method for controlling the same, if there is a higher possibility of such unexpected situations during traveling of the vehicle 1, the driver may input a desired control command to the input 318 to authorize the vehicle 1 to control vehicle traveling. If there is a high possibility that an unexpected situation associated with operation of the vehicle 1 will occur during driving of the vehicle 1, the driver may input a command for starting the ADAS of the vehicle 1 using the input 318. The input 318 designed to receive the above control command may be implemented as a button or switch, or may also be implemented in various shapes without departing from the scope or spirit of the present disclosure.

If a driver intention determination unit 130 contained in the controller 100 receives the command for starting the ADAS from the driver, this signals that the driver of the vehicle 1 is concern about the possibility of careless driving and thus inputs the command for starting the ADAS through the input. If the controller 100 receives the command for starting the ADAS from the driver (1000), the controller 100 may be configured to confirm traveling environments and traveling statuses of the vehicle 1 moving on the roads to determine whether to activate the ADAS of the vehicle 1. In other words, the command provided by the driver regarding driven intention may be input prior to any detection of careless driving such that the ADAS may take control of vehicle operation when such driving is detected. Careless driving may include detecting driver distraction, unintentional lane change (e.g., swerving), unintentional sudden engagement of accelerator pedal, or the like.

In other words, from the viewpoint of a current traveling environment and current traveling status of the vehicle 1, upon determining that the authority to control vehicle traveling is allocated to the driver without being allocated to the vehicle 1, the controller 100 may be configured to prevent activation of the ADAS even when the driver inputs the command for starting the ADAS of the vehicle 1. The controller 100 may be configured to determine the traveling environment of the vehicle 1 based on target object information detected by the image capturing part 350 and also the position and speed information of the target object detected by the detection sensor module 200.

Referring to FIG. 4, the traveling environment of the vehicle 1 may include at least one of a width (W1) of the road on which the vehicle 1 travels, a curvature (C1) of the road on which the vehicle 1 travels, a distance to an obstacle (ob) located in a forward direction of the moving vehicle 1, and a TTC time between the vehicle 1 and a target object. A traveling environment recognizer 110 contained in the controller 100 may be configured to recognize various traveling environments of the vehicle 1.

In particular, a target object located close to (e.g., in a predefined vicinity of the vehicle) the vehicle 1 (i.e., a host vehicle) may be another vehicle 2 that is moving in front of the host vehicle 1, or may be yet another vehicle 3 that is moving on crossroads or alleys located ahead of the current lane of the host vehicle 1. In other words, when the controller 100 determines the traveling environment of the vehicle 1 based on the above-mentioned factors, if it is undesirable that traveling of the vehicle 1 be adjusted using the ADAS of the vehicle 1 or if the operation for adjusting traveling of the vehicle 1 using the ADAS is considered unsafe, the controller 100 may be configured to prevent activation of the ADAS.

As described above, various factors capable of allowing the controller 100 to determine the traveling environment of the vehicle 1 may include not only the above-mentioned factors but also other factors. The controller 100 may be configured to determine whether the traveling environment of the vehicle 1 corresponds to or satisfies a predefined condition (1100). In particular, if the width (W) of the road on which the vehicle 1 travels is less than a predetermined length, the controller 100 may be configured to determine that the traveling environment of the vehicle 1 has satisfied the predefined condition. In addition, if the width (W) of the road on which the vehicle 1 travels is equal to or greater than the predetermined length, the controller 100 may be configured to determine a high possibility of collision between the vehicle 1 and another object, in which it may be undesirable to activate the ADAS without driver intention.

Further, if the curvature (C1) of the current lane of the vehicle 1 is less than a predetermined curvature value, the controller 100 may be configured to determine that the traveling environment of the vehicle 1 has satisfied the predefined condition. In particular, if the curvature (C1) of the current lane of the vehicle 1 is equal to or greater than the predetermined curvature value, the controller 100 may be configured to determine a high possibility of collision between the vehicle 1 and another object (e.g., peripheral vehicle 2 or 3 moving in front of the vehicle 1), in which it may be undesirable to activate the ADAS without driver intention.

Additionally, if the distance between the vehicle and the obstacle (ob) is less than a predetermined distance, the controller 100 may be configured to determine that the traveling environment of the vehicle 1 has satisfied the predefined condition. In particular, if the distance between the vehicle 1 and the obstacle (ob) is equal to or greater than the predetermined distance, the controller 100 may be configured to determine a high possibility of collision between the vehicle 1 and the obstacle (ob), in which it may be undesirable to activate the ADAS activation without driver intention.

In addition, if a TTC time between the vehicle 1 and a target object is greater than a predetermined time, the controller 100 may be configured to determine that the traveling environment of the vehicle 1 has satisfied the predefined condition. In particular, if the TTC time between the vehicle 1 and the object is equal to or less than the predetermined time, the controller 100 may be configured to determine a high possibility of collision between the vehicle 1 and the object, in which it may be undesirable to activate the ADAS without driver intention. Particularly, the target object located close to the vehicle 1 may be a peripheral vehicle 2 that is moving in front of the vehicle 1, or may be another peripheral vehicle 3 that is moving on crossroads or alleys located ahead of the current lane of the vehicle 1.

As shown in FIG. 4, the controller 100 may consider the traveling environments of the vehicle 1, for example, the width (W) and the curvature (C1) of the current lane of the vehicle 1, and may be configured to determine whether the distance between the vehicle 1 and either the obstacle (ob) or another object may be sufficiently guaranteed (i.e., determine whether the vehicle 1 is moving within a specific region Si in which current driving safety is guaranteed). In other words, if the traveling environment of the vehicle 1 corresponds to or satisfies the predefined condition, the controller 100 may be configured to determine to start operation of the ADAS.

The controller 100 may be configured to determine the traveling status of the vehicle 1 based on at least one of the traveling speed of the vehicle 1 and the steering angle of the vehicle 1. A traveling status recognizer 120 contained in the controller 100 may be configured to recognize various traveling statuses of the vehicle 1. In other words, when the controller 100 determines the traveling environment of the vehicle 1 based on various factors of the vehicle 1 (e.g., the traveling speed and the steering angle of the vehicle 1), if it is undesirable or unsafe for ADAS activation to be execute to control traveling of the vehicle 1, the controller 100 may be configured to prevent activation of the ADAS.

As described above, various factors for allowing the controller 100 to determine the traveling statuses of the vehicle 1 may include the above-mentioned factors and also other factors. The controller 100 may be configured to determine whether the traveling status of the vehicle 1 corresponds to or satisfies the predetermined condition (1200). In particular, if the traveling speed of the vehicle 1 detected by the speed sensor 80 is less than a predetermined speed, the controller 100 may be configured to determine that the traveling status of the vehicle 1 has satisfied the predefined condition. If the traveling speed of the vehicle 1 is equal to or greater than the predetermined speed, the controller 100 may be configured to determine a high possibility of collision between the vehicle 1 and another object, in which it may be undesirable to activate the ADAS without driver intention.

In addition, if the steering angle detected by a steering sensor (not shown) of the vehicle 1 is less than a predetermined angle, the controller 100 may be configured to determine that the traveling status has satisfied the predefined condition. In particular, if the steering angle of the vehicle 1 is equal to or greater than the predetermined angle, the controller 100 may be configured to determine a high possibility of collision between the vehicle 1 and another object, and the steering angle of the vehicle 1 is changed according to driver intention, in which it may be undesirable to activate the ADAS without driver intention. In other words, if the traveling status of the vehicle 1 corresponds to or satisfies the predefined condition, the controller 100 may be configured to start operation of the ADAS.

As described above, if the controller 100 receives the command for starting the ADAS of the vehicle 1 and determines that the traveling environment and traveling status of the vehicle 1 have satisfied the predefined condition, the controller 100 may be configured to start the ADAS of the vehicle 1 (1300). The above-mentioned ADAS may include at least one of a Smart Cruise Control System (SCCS), a Lane Keeping Assist System (LKAS), a Lane Departure Warning System (LDWS), a Forward Collision Avoidance system, and an Autonomous Emergency Brake (AEB) system. If necessary, the above-mentioned ADAS may further include various types of ADAS-based auxiliary systems.

The controller 100 may be configured to activate only one of the above-mentioned various advanced driver assistance systems (ADASs) of the vehicle 1, or may be configured to activate a plurality of systems to be simultaneously or sequentially as necessary. If the ADAS of the vehicle 1 starts operation, the controller 100 may be configured to advance a warning start time based on the ADAS by a predetermined time (1400).

As described above, in association with the target object located close to the vehicle 1 (e.g., within a predetermined distance from the subject vehicle) traveling within the same lane, the controller 100 may be configured to calculate a TTC time between the vehicle 1 and the target object based on at least one of position information and speed information of the target object detected by the detection sensor module 200. If the ADAS starts operation, the controller 100 may be configured to advance a collision warning start time decided based on the TTC time by a predetermined time.

Referring to FIG. 5, if a target object located in front of the host vehicle 1 traveling in the same lane is determined to be the peripheral vehicle 2, the controller 100 may be configured to calculate a TTC time between the host vehicle 1 and the peripheral vehicle 2 based on the position and speed information of the peripheral vehicle 2 detected by the detection sensor 200 and also the traveling speed of the host vehicle 1. The controller 100 may be configured to transmit a signal warning of collision between the host vehicle 1 and the peripheral vehicle 2 based on the calculated TTC time, and the display 303 and the notification unit 304 may be configured to transmit a warning message to the driver based on the transmitted warning collision signal.

Referring to FIG. 5, before the ADAS of the host vehicle 1 starts operation, a collision warning start time for warning of the danger of collision between the host vehicle 1 and the peripheral vehicle 2 may be set to a specific time point (t2), and a TTC time between the host vehicle 1 and the peripheral vehicle 2 at the time point (t2) may be set to a time point (Tb). In other words, before the ADAS of the host vehicle 1 starts operation, the controller 100 may be configured to output the collision warning signal at the time point (t2) where the TTC time between the host vehicle 1 and the peripheral vehicle 2 has a time duration (Tb) left until the host vehicle 1 collides with the peripheral vehicle 2. In contrast, after the ADAS of the host vehicle 1 starts operation, the controller 100 may be configured to advance the collision warning start time by a predetermined time, to thus output the collision warning signal at a time point (t1) where the TTC time between the host vehicle 1 and the peripheral vehicle 2 has a time duration (Ta) left until the host vehicle 1 collides with the peripheral vehicle 2.

Meanwhile, a braking start time for braking the host vehicle 1 to prevent collision between the host vehicle 1 and the peripheral vehicle 2 may be set to a time point (t3) before the ADAS of the host vehicle 1 starts operation, and may also be set to the time point (t3) even after the ADAS of the host vehicle 1 starts operation. In other words, as shown in FIG. 5, assuming that the distance between the host vehicle 1 and the peripheral vehicle 2 colliding with each other is set to zero '0', before the ADAS of the host vehicle 1 starts operation, the controller 100 may be configured to output the collision warning signal when the host vehicle 1 is located at a specific position (d2), and may be configured to execute braking of the host vehicle 1 when the host vehicle 1 is located at another position (d1).

In contrast, after the ADAS of the host vehicle 1 starts operation, the controller 100 may be configured to output the collision warning signal when the host vehicle 1 is located at a position (d3), to provide the driver of the host vehicle 1 with a sufficiently long reaction time prior to collision with the host vehicle 1. In addition, although the controller 100 may advance the collision warning start time between the host vehicle 1 and another object, if the host vehicle 1 deviates from a current lane, the controller 100 may be configured to advance a lane departure warning start time. The controller 100 may also be configured to advance a start time of any other warning messages as necessary.

In other words, if the driver of the host vehicle 1 anticipates occurrence of careless driving situation during traveling of the host vehicle 1, and inputs the command for starting the ADAS of the host vehicle 1, such that the ADAS of the host vehicle 1 starts operation, the controller 100 may be configured to advance a start time of various warning messages to be output to the driver of the host vehicle 1. Therefore, the controller 100 may guarantee safety in driving of the host vehicle 1 even when the driver's careless driving situation of the host vehicle 1 occurs.

Warning messages associated with traveling and operation of the host vehicle 1 may be visually output to the driver of the host vehicle 1 through the display 303. Alternatively, warning messages associated with traveling and operation of the host vehicle 1 may also be audibly output to the driver of the host vehicle 1 through the notification unit 304. When the ADAS starts operation, the controller 100 may be configured to adjust a reference value for releasing the ADAS operation to be higher than a predetermined value (1500). In other words, since the driver of the host vehicle 1 inputs a command for starting the ADAS after anticipating occurrence of a careless driving situation, and the ADAS is then activated by the command, the controller 100 may be configured to maintain the activation of the ADAS (e.g., prevent release thereof) even when the driver's careless driving situation occurs.

There are various examples of such careless driving situation of the driver operating the host vehicle 1. For example, during traveling of the host vehicle 1, when the driver sneezes or coughs, or when the driver fails to keep eyes forward or is otherwise distracted, the driver belatedly realizes the approaching danger and thus unintentionally turns the steering wheel to the right or left. In another example, since the driver neglects looking forward while driving the host vehicle 1, the driver may mistake an accelerator for a brake, resulting in traffic accidents.

A conventional ADAS-embedded vehicle has been designed to automatically release the ADAS operation when a driver of the vehicle repeatedly intervenes in vehicle control at least a predetermined number of times during the ADAS operation. As a result, although the conventional ADAS-embedded vehicle starts operation of the ADAS after anticipating occurrence of a careless driving situation, when the careless driving situation occurs, the ADAS operation is unavoidably released.

In contrast, according to the exemplary embodiment of the present disclosure, when the ADAS of the vehicle 1 starts operation, the controller 100 may be configured to continuous monitor the vehicle surroundings and detect driver intention during a predetermined time ($t_m$). In other words, if a numerical value of a predetermined variable is changed according to a change of the traveling status of the vehicle 1, the driver intention determination unit 130 contained in the controller 100 may be configured to determine whether the driver directly attempts to operate the vehicle 1 to change the traveling status of the vehicle 1.

As illustrated in the graph of FIG. 6, if a numerical value affected by the traveling status changed at a specific time point ($t_b$) is increased up to a predetermined value or higher during traveling of the vehicle 1, the controller 100 may be configured to determine the presence or absence of the driver's control intention. In particular, the numerical value of the variable based on the changed traveling status of the vehicle 1 may include at least one of a numerical value that indicates the traveling speed of the vehicle 1 and a numerical value that indicates the steering angle of the vehicle 1.

In other words, the controller 100 may be configured to determine the degree of the instantaneous change of the traveling speed of the vehicle 1 or may be configured to determine whether the steering angle of the vehicle 1 is changed by a predetermined angle or greater. As a result, in response to receiving the above determination results, the controller 100 may be configured to determine whether the driver intends to directly adjust driving of the vehicle 1 although the ADAS operation is being executed.

As illustrated in FIG. 6, the controller 100 may be configured to adjust the reference value for releasing the ADAS operation to be greater than a predetermined reference value by a predetermined magnitude. In other words, before the ADAS of the vehicle 1 starts operation, the reference value for releasing the ADAS operation may be set to 'V1'. In contrast, after the ADAS of the vehicle 1 starts operation, the reference value for releasing the ADAS operation may increase up to 'V2'.

During operation of the vehicle 1, the controller 100 may be configured to determine the numerical value of the variable based on the traveling status change of the vehicle 1 that is monitored during a predetermined time ($t_m$). In particular, if the determined numerical value of the variable is greater than the increased reference value (V2) for releasing the ADAS operation, the controller 100 may be configured to stop operation of the ADAS (1900). The controller 100 may then be configured to determine whether the numerical value of the variable based on the changed traveling status of the vehicle 1 is greater than the operation release reference value increased by initiation of the ADAS (1600).

In other words, although the operation release reference value increases from V1 to V2 due to such initiation of the ADAS, if the numerical value of the variable based on the traveling status change of the vehicle 1 is greater than the increased operation release reference value, the driver intends to intervene in control of the vehicle 1, and thus, the controller 100 may be configured to stop operation of the ADAS of the vehicle 1.

Meanwhile, if the numerical value of the variable based on the traveling status change of the vehicle 1 is less than the increased operation release reference value, the controller 100 may be configured to continue the operation of the ADAS of the vehicle 1 (e.g., not stop operation thereof), to allow the ADAS to be continuously controlled to properly respond to either the increasing traveling speed of the vehicle 1 affected by the driver's careless driving situation or the instantaneous change of the steering angle.

Referring to FIG. 6, assuming that a Lane Keeping Assist System (LKAS) or a Lane Departure Warning System (LDWS) operates as the ADAS of the vehicle 1, if the numerical value of the variable based on the traveling status change of the vehicle 1 is greater than the operation release reference value (V1) under the condition that the operation release reference value of the system is not increased (V1), the ADAS operation may be released, and thus, the vehicle 1 deviates from the lane and moves to a position (1a). In other words, since the system operation is released even when the vehicle 1 is operated by instantaneous careless driving of the driver at the operation state (V1) in which the operation release reference value of the ADAS is not increased, the Lane Keeping Assist System (LKAS) or the Lane Departure Warning System (LDWS) may not operate.

On the other hand, in the operation status (V2) in which the operation release reference value of the ADAS is increased, the numerical value of the variable based on the traveling status change of the vehicle 1 less than the operation release reference value (V2), the ADAS operation may not be released. As a result, even when the vehicle 1 attempts to deviate from the lane due to occurrence of the driver's instantaneous careless driving, the vehicle 1 may be located at the position (1b) without deviating from the lane through the LKAS or LDWS operation.

If the numerical value indicating the traveling speed of the vehicle 1 is greater than the increased operation release reference value, the controller 100 may be configured to stop operation of the ADAS. If the numerical value indicating the steering angle of the vehicle 1 is greater than the increased operation release reference value, the controller 100 may be configured to stop operation of the ADAS (1900). In addition, the controller 100 may be configured to determine whether a predetermined period of time has elapsed after activation of the ADAS of the vehicle 1 (1700). If the predetermined time has elapsed, the controller 100 may be configured to stop operation of the ADAS (1900).

If the driver inputs the command for stopping the ADAS through the input 318 during activation of the ADAS, the controller 100 may be configured to determine whether the command for stopping the ADAS has been received (1800), and may thus stop operation of the ADAS. Various types of information associated with the above-mentioned control and operations of the vehicle 1 may be supplied to the driver through the display 303.

The vehicle and the method for controlling the same according to the exemplary embodiment of the present disclosure have the following effects. The vehicle may automatically operate the ADAS by recognizing driver intention, such that the vehicle may advance a control start time of the ADAS, resulting in driving safety of the vehicle. In addition, the vehicle may raise the operation release reference level of the ADAS, such that the ADAS is released only in a specific situation, and a dangerous driving situation caused by occurrence of an unexpected careless driving situation may be prevented.

The above-mentioned embodiments may be implemented in the form of a recording medium storing commands capable of being executed by a computer system. The commands may be stored in the form of program code. When the commands are executed by the processor, a program module is generated by the commands so that the operations of the disclosed exemplary embodiments may be carried out. The recording medium may be implemented as a non-transitory computer-readable recording medium. The non-transitory computer-readable recording medium includes all types of recording media storing data readable by a computer system. Examples of the non-transitory computer-readable recording medium include a Read Only Memory (ROM), a Random Access Memory (RAM), a magnetic tape, a magnetic disk, a flash memory, an optical data storage device, etc.

As is apparent from the above description, the vehicle and the method for controlling the same according to the exemplary embodiments of the present disclosure may advance a control start time of the ADAS by automatically operating the advanced driver assistance system (ADAS) after recognizing driver intention, resulting in guarantee of safe driving. In addition, the vehicle may release operation of the ADAS only in a specific situation by raising a reference level for releasing the operation of the ADAS, such that the possibility of danger caused by unexpected careless driving is greatly reduced.

Although a few exemplary embodiments of the present disclosure have been shown and described, it would be appreciated by those skilled in the art that changes may be made in these exemplary embodiments without departing from the principles and spirit of the invention, the scope of which is defined in the claims and their equivalents.

What is claimed is:

1. A vehicle, comprising:
   an image capturing device configured to detect an object by capturing an image of the object located in a peripheral region of a vehicle;
   a detection sensor configured to acquire at least one position information of the object and speed information of the object;
   an input configured to receive a command for starting an operation of an advanced driver assistance system (ADAS) of the vehicle; and
   a controller configured to:
      receive the command for starting the operation of the advanced driver assistance system (ADAS) of the vehicle;
      start the operation of the advanced driver assistance system (ADAS) when a traveling environment and traveling status of the vehicle satisfy a predefined condition;
      advance a warning start time based on the operation of the advanced driver assistance system (ADAS) by a predetermined period of time after starting operation of the advanced driver assistance system (ADAS); and
      allow an operation release reference value for releasing the operation of the advanced driver assistance system (ADAS) to be greater than a predetermined value.

2. The vehicle according to claim 1, wherein the controller is configured to:
   determine the traveling environment of the vehicle based on at least one of information detected by the image capturing and information acquired by the detection sensor,
   wherein the traveling environment of the vehicle includes at least one selected from the group consisting of: a width of a road on which the vehicle 1 travels, a curvature of the road on which the vehicle travels, a distance to an obstacle located in a forward direction of the traveling vehicle, and a time-to-collision (TTC) time between the vehicle and the object.

3. The vehicle according to claim 1, wherein the controller is configured to determine the traveling status of the vehicle based on at least one of a traveling speed of the vehicle and a steering angle of the vehicle.

4. The vehicle according to claim 2, wherein when the width of the road on which the vehicle travels is less than a predetermined length, when a curvature of the traveling road of the vehicle is less than a predetermined curvature value, when the distance between the vehicle and the obstacle is less than a predetermined distance, and when a time-to-collision (TTC) time between the vehicle and the object is greater than a predetermined time, the controller is configured to determine that the traveling environment of the vehicle has satisfied the predefined condition.

5. The vehicle according to claim 3, wherein when the traveling speed of the vehicle is less than a predetermined speed and when the steering angle of the vehicle is less than a predetermined angle, the controller is configured to determine that the traveling status of the vehicle has satisfied the predefined condition.

6. The vehicle according to claim 1, wherein the controller is configured to calculate a time-to-collision (TTC) time between the vehicle and the object according to at least one of the position information and the speed information of the object detected by the detection sensor; and when the advanced driver assistance system (ADAS) starts operation, the controller is configured to advance a collision warning start time determined based on the calculated time-to-collision (TTC) time by a predetermined period of time.

7. The vehicle according to claim 1, wherein:
   when the advanced driver assistance system (ADAS) starts operation, the controller is configured to allow the operation release reference time for releasing the advanced driver assistance system (ADAS) operation to be greater than the predetermined value by a predetermined magnitude; and
   when a numerical value of a variable based on a change of the traveling status of the vehicle is greater than the increased operation release reference time, the controller is configured to stop operation of the advanced driver assistance system (ADAS).

8. The vehicle according to claim 7, wherein the numerical value of the variable based on the change of the traveling status of the vehicle includes at least one of a numerical value indicating a traveling speed of the vehicle and a numerical value indicating a steering angle of the vehicle.

9. The vehicle according to claim 8, wherein:
   when the numerical value indicating the traveling speed of the vehicle is greater than the increased operation release reference value, the controller is configured to stop operation of the advanced driver assistance system (ADAS); and
   when the numerical value indicating the steering angle of the vehicle is greater than the increased operation release reference value, the controller is configured to stop operation of the advanced driver assistance system (ADAS).

10. The vehicle according to claim 1, wherein after lapse of a predetermined period of time from beginning of the operation of the advanced driver assistance system (ADAS), the controller is configured to stop operation of the advanced driver assistance system (ADAS).

11. The vehicle according to claim 1, wherein when the advanced driver assistance system (ADAS) starts operation and a command for stopping operation of the advanced driver assistance system (ADAS) is input to the controller, the controller is configured to stop operation of the advanced driver assistance system (ADAS).

12. The vehicle according to claim 1, further comprising:
a speed sensor configured to detect a traveling speed of the vehicle; and
a speed regulator configured to regulate the traveling speed of the vehicle.

13. The vehicle according to claim 1, wherein the advanced driver assistance system (ADAS) includes at least one of a Smart Cruise Control System (SCCS), a Lane Keeping Assist System (LKAS), a Lane Departure Warning System (LDWS), a Forward Collision Avoidance (FCA) system, and an Autonomous Emergency Brake (AEB) system.

14. A method for controlling a vehicle, comprising:
detecting, by a controller, an object by capturing an image of the object located in a peripheral region of a vehicle;
acquiring, by the controller, at least one position information of the object and speed information of the object;
receiving, by the controller, a command for starting an operation of an advanced driver assistance system (ADAS) of the vehicle;
starting, by the controller, the operation of the advanced driver assistance system (ADAS), when a traveling environment and traveling status of the vehicle satisfy a predefined condition;
advancing, by the controller, a warning start time based on the operation of the advanced driver assistance system (ADAS) by a predetermined period of time, when the advanced driver assistance system (ADAS) starts operation; and
allowing, by the controller, an operation release reference value for releasing the operation of the advanced driver assistance system (ADAS) to be greater than a predetermined value.

15. The method according to claim 14, further comprising:
determining, by the controller, the traveling environment of the vehicle based on at least one of information detected through the object image capturing and the acquired information,
wherein the traveling environment of the vehicle includes at least one selected from the group consisting of: a width of a road on which the vehicle 1 travels, a curvature of the road on which the vehicle travels, a distance to an obstacle located in a forward direction of the traveling vehicle, and a time-to-collision (TTC) time between the vehicle and the object.

16. The method according to claim 14, further comprising:
determining, by the controller, the traveling status of the vehicle based on at least one of a traveling speed of the vehicle and a steering angle of the vehicle.

17. The method according to claim 15, further comprising:
when the width of the road on which the vehicle travels is less than a predetermined length, when a curvature of the traveling road of the vehicle is less than a predetermined curvature value, when the distance between the vehicle and the obstacle is less than a predetermined distance, and when a time-to-collision (TTC) time between the vehicle and the object is greater than a predetermined time, determining, by the controller, that the traveling environment of the vehicle has satisfied the predefined condition.

18. The method according to claim 16, further comprising:
when the traveling speed of the vehicle is less than a predetermined speed and when the steering angle of the vehicle is less than a predetermined angle, determining, by the controller, that the traveling status of the vehicle has satisfied the predefined condition.

19. The method according to claim 14, further comprising:
calculating, by the controller, a time-to-collision (TTC) time between the vehicle and the object according to at least one of the position information and the speed information of the object,
wherein the advancing the warning start time by the predetermined time includes:
after the advanced driver assistance system (ADAS) starts operation, advancing, by the controller, a collision warning start time determined based on the calculated time-to-collision (TTC) time by the predetermined period of time.

20. The method according to claim 14, further comprising:
when the advanced driver assistance system (ADAS) starts operation, allowing, by the controller, the operation release reference time for releasing the advanced driver assistance system (ADAS) operation to be greater than the predetermined value by a predetermined magnitude; and
when a numerical value of a variable based on a change of the traveling status of the vehicle is greater than the increased operation release reference time, stopping, by the controller, operation of the advanced driver assistance system (ADAS).

21. The method according to claim 20, wherein the numerical value of the variable based on the change of the traveling status of the vehicle includes at least one of a numerical value indicating a traveling speed of the vehicle and a numerical value indicating a steering angle of the vehicle.

22. The method according to claim 21, further comprising:
when the numerical value indicating the traveling speed of the vehicle is greater than the increased operation release reference value, stopping, by the controller, operation of the advanced driver assistance system (ADAS); and
when the numerical value indicating the steering angle of the vehicle is greater than the increased operation release reference value, stopping, by the controller, operation of the advanced driver assistance system (ADAS).

23. The method according to claim 14, further comprising:
after lapse of a predetermined period of time from beginning of the operation of the advanced driver assistance system (ADAS), stopping, by the controller, operation of the advanced driver assistance system (ADAS).

24. The method according to claim 14, further comprising:
in response to receiving a command for stopping operation of the advanced driver assistance system (ADAS) after beginning of the operation of the advanced driver assistance system (ADAS), stopping, by the controller, operation of the advanced driver assistance system (ADAS).

* * * * *